(12) United States Patent
Green et al.

(10) Patent No.: US 8,448,887 B2
(45) Date of Patent: May 28, 2013

(54) FOOD GRATER

(75) Inventors: David Green, Toronto (CA); David Chan, Scarborough (CA); Karen Chow, Toronto (CA)

(73) Assignee: Browne & Co., Markham (CA)

( * ) Notice: Subject to any disclaimer, the term of this patent is extended or adjusted under 35 U.S.C. 154(b) by 160 days.

(21) Appl. No.: 12/974,481

(22) Filed: Dec. 21, 2010

(65) Prior Publication Data
US 2012/0153062 A1 Jun. 21, 2012

Related U.S. Application Data

(60) Provisional application No. 61/289,175, filed on Dec. 22, 2009, provisional application No. 61/302,369, filed on Feb. 8, 2010.

(51) Int. Cl.
*B02C 19/20* (2006.01)
*A47J 17/00* (2006.01)

(52) U.S. Cl.
USPC .......................... 241/95; 241/168; 241/273.1

(58) Field of Classification Search
USPC .................. 241/95, 168, 273.1–273.4, 282.1
See application file for complete search history.

(56) References Cited

U.S. PATENT DOCUMENTS

| 2,405,056 | A | * | 7/1946 | Rosenbloom | 241/273.1 |
| 6,318,652 | B1 | * | 11/2001 | Liu | 241/95 |
| 6,945,486 | B2 | * | 9/2005 | Teng | 241/169.1 |
| 7,469,848 | B2 | * | 12/2008 | Yamanaka et al. | 241/95 |

FOREIGN PATENT DOCUMENTS

| FR | 2127111 A5 | 10/1972 |
| GB | 2054358 A | 2/1981 |
| GB | 2088201 A | 6/1982 |
| NL | 8602611 A | 1/1987 |
| WO | 2009/043207 A1 | 4/2009 |

OTHER PUBLICATIONS

Extended European Search Report dated Mar. 16, 2011 issued from the European Patent Office for corresponding European Patent No. 10160991.5.

* cited by examiner

*Primary Examiner* — Faye Francis
(74) *Attorney, Agent, or Firm* — Gowling Lafleur Henderson LLP

(57) ABSTRACT

The present matter provides an improved grating surface and graters having an improved grating surface. The grating surface includes one or more cutting blades extending outwardly from the grating surface each including a cutting edge, and at least one groove located on the grating surface and extending towards the cutting edge of the at least one cutting blade. The at least one groove can be located on the cutting blade surface and extend towards and into the cutting edge. The at least one grove can be formed by chemical etching techniques (e.g. in a grating surface of metal such as stainless steel). Grooves and cutting blades can be simultaneously formed in a grating surface by chemical etching.

12 Claims, 8 Drawing Sheets

FOOD GRATER

This application claims the benefit of the prior filing of U.S. Provisional Patent Application Serial No. 61/289,175 filed Dec. 22, 2009. U.S. Provisional Patent Application Serial No. 61/302,369, Feb. 08, 2010, and European Patent Application Serial No. 10160991.5 filed Apr. 26, 2010, the disclosure of which is incorporated herein by reference.

FIELD OF THE INVENTION

The present matter relates to food graters, particularly manually operated food graters.

BACKGROUND OF THE INVENTION

Food graters are generally known for grating, cutting and/or slicing food. The common example of a food grater is a cheese grater that is used to grate a block of cheese into small shredded cheese pieces.

Manual food graters require a user to hold the piece of food (directly or using a holder) against the grating surface. Forces are applied to the food while the food is grated to ensure that sufficient grating occurs. One force component directs the food toward the surface of the grater and another directs the food toward the grater blade(s). The texture and/or density of the food item will affect the way the item is grated and certain types of food require more force to be placed upon them to achieve sufficient grating. The application of such forces can cause several problems in the grating process including irregular grated food pieces, tiredness of the user and physical changes to the food item being grated, for example cheese being squashed as it is forced against a grating surface.

It is therefore advantageous to provide a food grater that allows a user to grate food items of different physical characteristics without having to apply a great amount of force on the food item.

SUMMARY OF THE INVENTION

The present matter provides a grating surface comprising one or more cutting blades extending outwardly from the grating surface each including a cutting edge, and at least one groove located on the grating surface and extending towards the cutting edge of the at least one cutting blade.

The present matter further provides a grating surface comprising one or more cutting blades extending outwardly from the grating surface each including a cutting edge, and at least one groove, located on at least one cutting blade at the cutting edge, the at least one groove increasing the surface area of the cutting blade relative to the cutting blade having no groove.

BRIEF DESCRIPTION OF THE DRAWINGS

The food grater described herein will now be discussed in further detail with specific reference to the accompanying Figures in which.

DETAILED DESCRIPTION OF THE PREFERRED EMBODIMENTS

The present matter provides a grating surface that provides an efficient and easy to use cutting edge for grating food items while providing a greater amount of grated food relative to a traditional grating surface. The grating surface may be used by itself or may be placed in a food grater for easy use.

The present matter provides a grating surface that includes one or more cutting blades and further includes a plurality of grooves extending along the grating surface. The grating surface including the grooves provides a surface area that will result in reduced friction when in contact with a food material to be grated relative to a grating surface not including the at least one groove.

In one embodiment, the present matter provides a grating surface that includes a one or more cutting blades each having a cutting edge. At least one groove is located on the grating surface and extends along the top of the blade to the cutting edge which provides a cutting edge having an increased cutting surface relative to the cutting edge without the groove.

Figure 1:
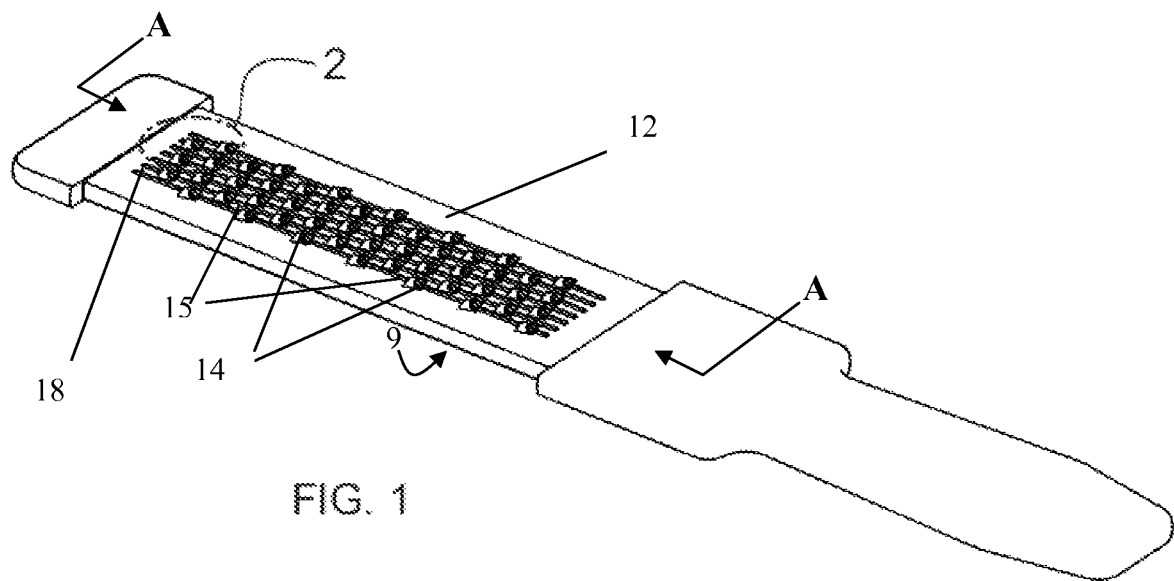
FIG. 1 is a perspective view of one embodiment of a food grater including a grater surface described herein.

The grating surface will now be described in further detail with reference to FIGS. 1 through 5. Turning to FIG. 1, the grating surface is indicated generally at numeral 12. There is an opposite surface 9. The grating surface includes one or more and in this case a plurality of cutting blades 14, extending outwardly from the grating surface 12, each including a cutting edge 16. Adjacent each blade 14, surface 12 defines a void 15 (or blade window) through which grated food passes. The grating surface 12 includes a plurality of grooves, indicated generally at numeral 18. The grooves extend along the surface of the cutting blade 14. The grooves are generally parallel and evenly spaced to reduce friction with food when grating.

Figure 4:
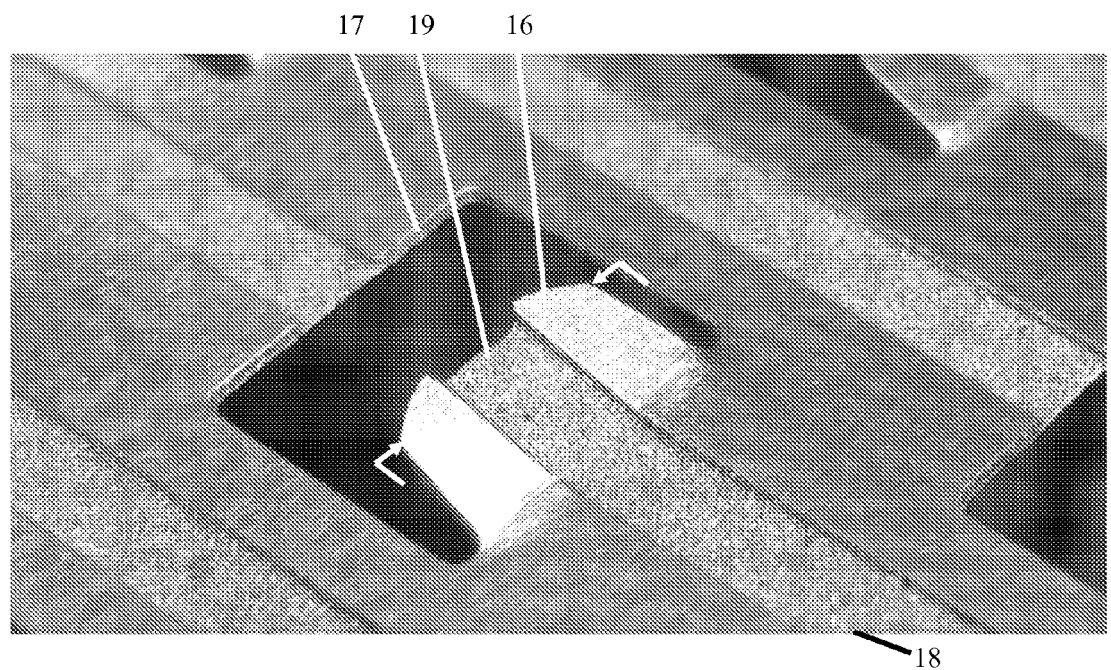
FIG. 4 is an enlarged view of one embodiment of the grating surface described herein, showing the grooves within the cutting blade ending at the cutting edge.

When discussed herein, the length of the cutting edge 16 refers to the length between letters L-L, indicated in FIG. 4. The length of the cutting edge 16 is the portion of the cutting edge 16 that comes into contact with the food item. In addition, there is a blade presenting edge 17 which is located at the edge of the grating surface 12 that faces the blades cutting edge 16.

It will be understood that while the description refers to the "groove" indicated in the figures at numeral 18, it may also be referred to as a channel or depression. The groove 18 refers to a portion of the grating surface 12 that has been removed and results in the grating surface 12 having a cross sectional profile at the position of the groove 18 that includes an indentation or cut away portion. The inclusion of the groove 18 within the grating surface 12 provides a grating surface 12 that causes less friction to occur when a food material is placed on the grating surface 12 and moved along it towards the blade presenting edge 17, i.e. during the action of grating the food material, due to the reduced contact between the grating surface 12 and the food material.

Figure 2:
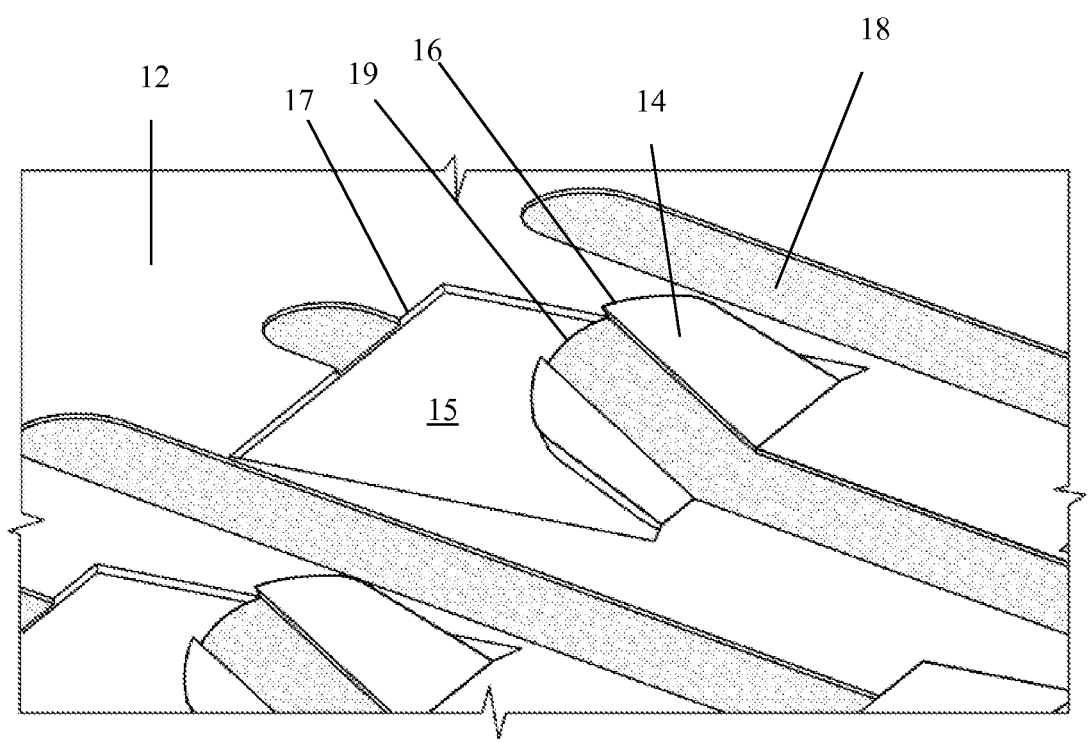
FIG. 2 is an enlarged view of a portion of the grating surface identified at circle 2 in FIG. 1, showing the grooves along the grating surface.

As shown in the Figures, and in particular in FIG. 2, the grating surface 12 may include a series of grooves 18 that extend along the length of the grating surface 12. The grooves 18 are located along the grating surface 12 at a position leading towards and up to the edge of the blade presenting edge 17. In other words the grooves 18 lead towards the cutting edge 16 in the same path that the food material will travel during grating, i.e. towards the cutting edge 16 of the blades 14.

Figure 6:
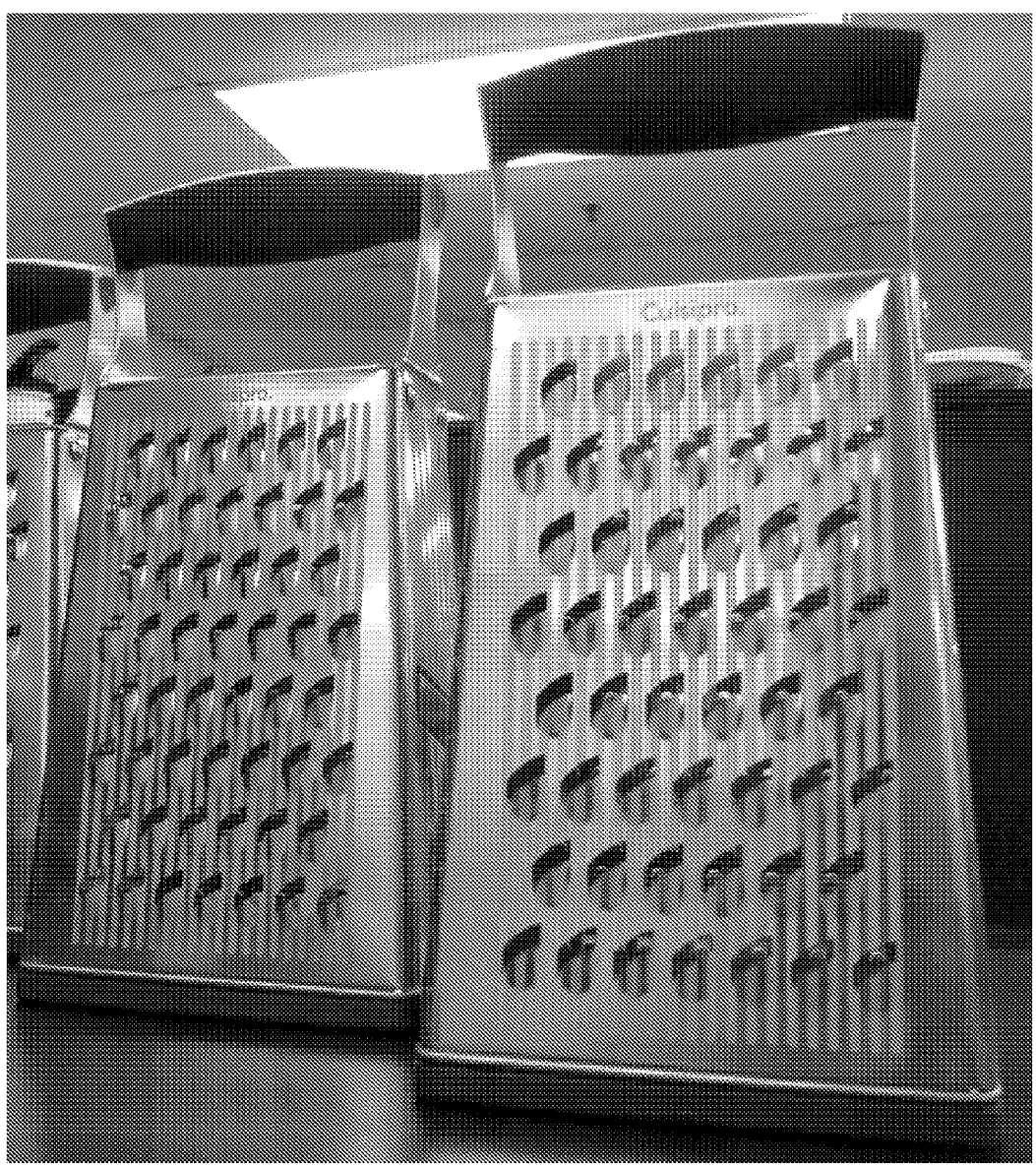
FIG. 6 is a perspective view of one embodiment of a food grater including the grating surface described herein.

In one embodiment, shown in an enlarged view in FIGS. 2 and 4, the grooves 18 extend along the surface of the blade 14 to the blade presenting edge 17 and proceed to also extend along the surface of the blade 14. The cutting edge 16 therefore includes at least one groove which also creates a cutting edge 16 having a longer length compared with the same cutting edge 16 having no groove within it. This provides a greater cutting edge for contact with the food item which in turn results in more efficient grating. In general, the portion 19 of the cutting edge 16 within the groove 18 is sharper than the remaining portion of edge 16. The sharper edge may make grating effort easier. FIG. 6 shows blade edges having more than one portion 19 per blade.

Figure 5:
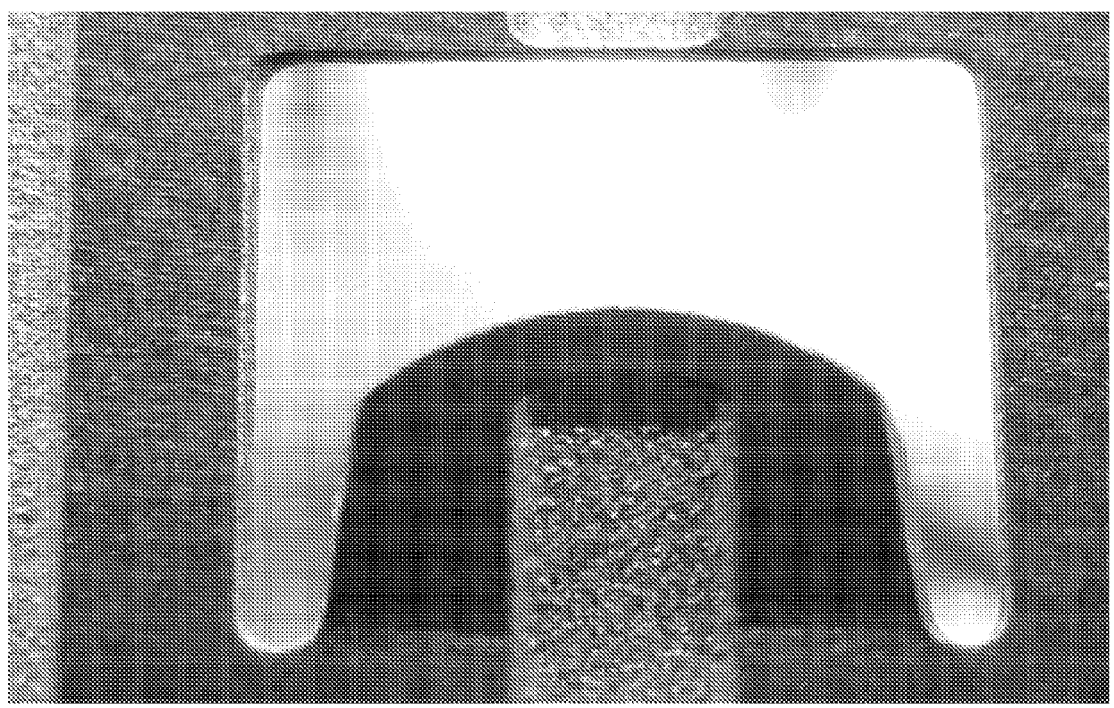
FIG. 5 is an enlarged view of one embodiment of the grating surface described herein, showing the grooves within the cutting blade ending before the cutting edge.

In an alternative embodiment, shown in FIG. 5, the at least one groove 18 extends along the grating surface 12, as described above, and extends along a portion of the surface of the blade 14 but ends before the cutting edge 16, i.e. the cutting edge 16 does not include the groove 18.

As will be understood from the Figures provided, the grating surface 12 described herein may include any number and configuration of cutting blades 14. In addition, the grating surface 12 and cutting blades 14 may include any number and configuration of grooves 18 provided that the efficiency of grating, described herein, is achieved.

Generally, an array of regularly arranged blades 14 is preferred. In the present embodiments, rows are blades are evenly spaced and generally parallel to one another. The rows of blades may be arranged orthogonally (perpendicularly) to the longitudinal axis A-A of the grater (e.g. in the direction of grating). In FIG. 1 the rows are slanted from the perpendicular. Rows need not have the same number of blades. Rows may be offset from one another such that blades in adjacent rows (e.g. 3 adjacent rows) need not align in a single column along the axis A-A. For example, in FIG. 1, rows alternate having 4 or 3 blades. The 3 blade rows are offset from 4 blade rows such that the 3 blades are arranged between the four blades in the axis A-A. Other patterns may be adopted.

Figure 3:
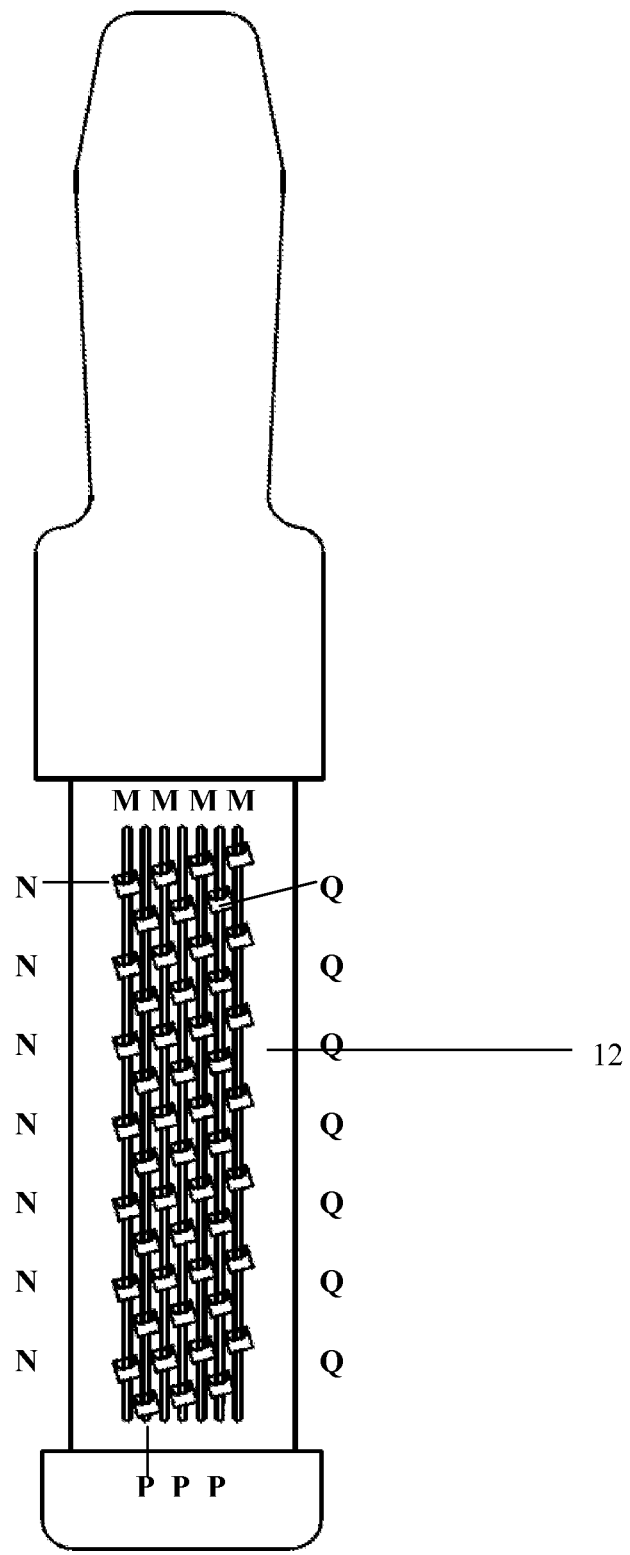
FIG. 3 is a top view of one embodiment of a grating surface, as described herein.

In the present embodiment, the grooves 18 generally extend in the direction of the longitudinal axis A-A. The grooves are parallel and evenly spaced in the present embodiment. The grooves and blades are arranged in a regular pattern. With reference to FIG. 3, one set of grooves (individually M) extends to intersect the blades of the rows N having 4 blades per row and one set of grooves (individually P) extends to intersect the blades Q of the rows having 3 blades per row. Grooves from these sets of grooves are arranged to alternate over the surface 12. Though the sets alternate 1 by 1, more grooves could be used and alternate 2 by 2 for example or 1 by 2. In some embodiments, the grooves are merely evenly spaced. See FIG. 6 for example where the grooves are evenly spaced and where two or more grooves intersect a specific blade.

In one embodiment, at least the grating surface and blades are formed from a sheet of stainless steel, sometimes called a blank. Stainless steel is well suited to food preparation equipment and is further suitable for defining sharp blades in a grater. In such an embodiment, the groove(s) and blade edges may be chemically etched (e.g. acid etched) into the grating surface. Acid etching is a technique that is known. For example, U.S. patent application Ser. No. 10/503,905 (Publication No. 20050161429 of Jul. 28, 2005) entitled "Non-symmetrical photo tooling and dual surface etching" describes a method of two-sided chemical etching of grater blades which is incorporated herein by reference in its entirety.

For the grating surface described herein, the chemical etching process preferably occurs on both sides of the cutting blade. Void 15 may be defined by etching from one, the other or both surfaces. Blade edge 16 is generally defined by a blade profile having a top and bottom bevel relative to the surface 12 and opposite surface 9 of the grater. To define the blade profile, in one embodiment, on one surface the acid etching may be applied to remove about 70-90% of the blade profile while on the other surface it may be applied to remove from 10-30% of the blade profile. It will be understood, however, that the etching may be applied to remove from 1-99% of the blade profile on either surface. It will also be understood that the blade may be etched on one side only and not on both. Further it will be understood that while acid etching is described above, other means for removing part of the blade profile may be used, for example laser etching, stamping or cutting.

In one embodiment, where the groove 18 extends up to the cutting edge 16 of the blade 14, the depth of the groove 18 is preferably in the range of about 8% to about 50% of the thickness, or depth, of the blade 14. As an example, the blade thickness may be around 0.1 mm and include a groove that has a depth of 0.008 mm to 0.05 mm. In another example, the blade thickness may be 0.6 mm and the groove may between 0.048 mm to 0.3 mm in depth.

Blade 14 or at least a portion of edge 16 may extend away from surface 12, for example, by bending. Blades 14 and voids 15 may take different shapes. See FIGS. 4 and 6 for example. It will be understood that in one embodiment, a groove 18 may be positioned at the edge of the cutting blade 14 and may extend along the entire length of the cutting edge 16.

Figure 7:
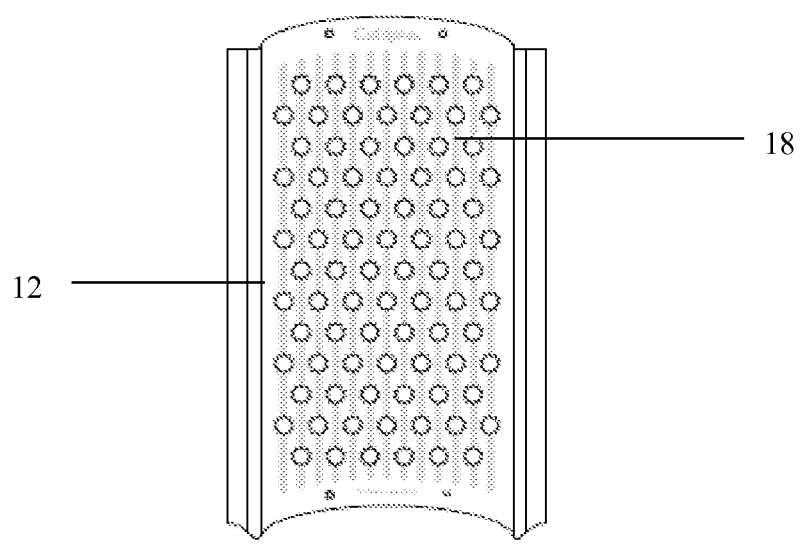
FIGS. 7 and 8 illustrate respective embodiments of a grating surface showing grooves ending before the individual cutting blades.

FIG. 7 illustrates a further embodiment of the grating surface 12 described herein, shown including cutting blades 14 traditionally used on a parmesan grater. As can be seen, grooves 18 are located across the cutting surface 12 and lead up to the individual cutting blades 14.

Figure 8:
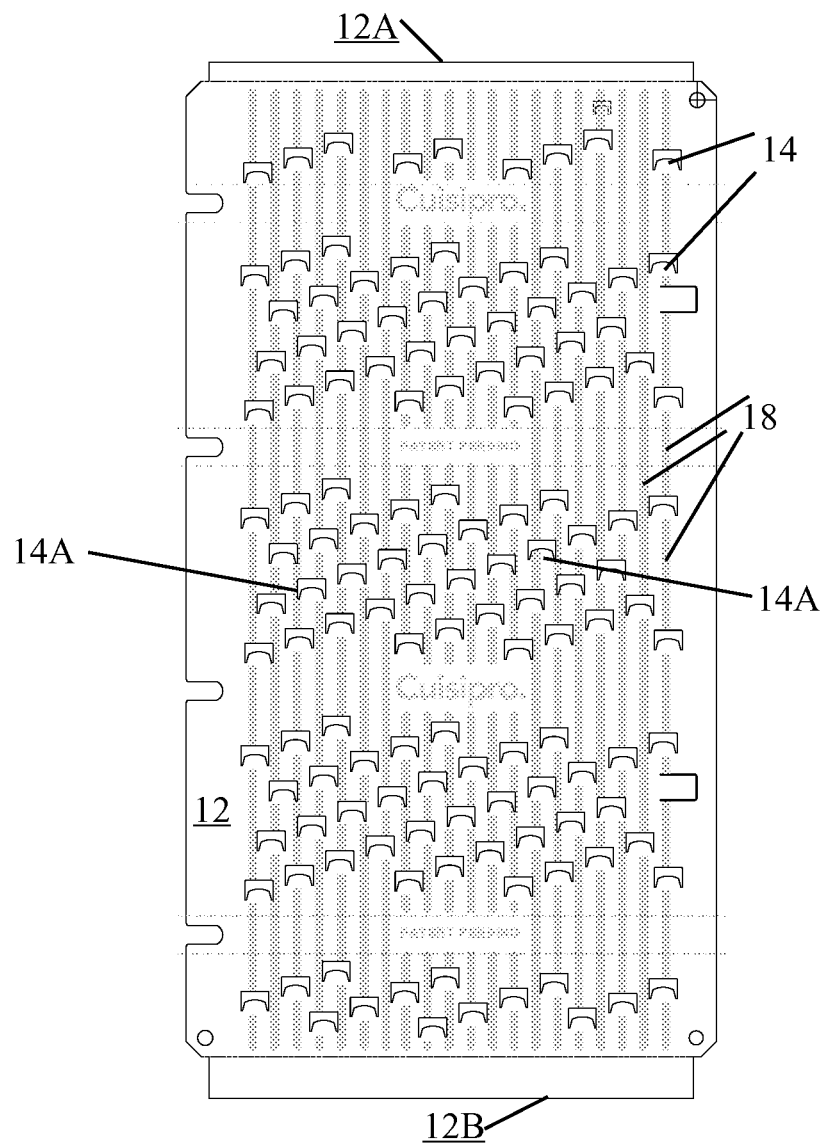

FIG. 8 illustrates a further embodiment of the grating surface 12 described herein in the form for a rotary grater. In a rotary grater, the surface 12 is shaped to form a cylinder whereby ends 12A and 12B are connected. As can be seen, grooves 18 are located across the cutting surface 12 and generally lead up to but short of the individual cutting blades 14. In some instances (e.g. 14A) a blade is formed with only a portion of a groove.

For certain applications, it may be preferred that individual blades are not formed with grooves or only with a partially width of a groove. In some embodiments, the groove (stripe) may stop short of the blade window 15 (FIG. 8). The groove may stop just short (e.g. by 0.5 mm) of the blade window. Forming the blades without grooves, or with only a portion of a groove (e.g. 14A), may be preferred so as to maintain blade shape integrity after use. Blades which are thinned by the formation of grooves may be susceptible to deformation from use, for example, where the food to be grated is relatively hard or where user pressure on the food against the blades when in use is sufficiently high to result in deformation.

Blanks may be shaped as desired and assembled (e.g. with handles, etc) to form graters. Common graters include rasps, hand graters, rotary graters, box graters, etc. The cutting surface described herein may be used in any grating device, as shown for example in FIGS. 1, 3 and 6. FIG. 6 illustrates two box graters including several embodiments of a grating surface, as described herein. Other types of graters, such as a rotary grater, may also incorporate the grating surface 12 described herein.

The use of the grating surface 12 and any grating device that incorporates the grating surface will not be described in detail herein as the use of such devices are well known in the art. However, it will be understood that the food material is moved in a grating direction towards the cutting blade along the grating surface that includes the grooves therein so as to reduce the friction between the food material and the grating surface.

While this invention has been described with reference to illustrative embodiments and examples, the description is not intended to be construed in a limiting sense. Thus, various modification of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

The invention claimed is:

1. A grater having a grating surface comprising:
   at least one cutting blade extending outwardly from a first surface of the grating surface and said at least one cutting blade having a cutting edge, and
   at least one groove located on the first surface of the grating surface and extending along a length of the first surface and leading towards the cutting edge of the at least one cutting blade.

2. The grater according to claim 1, wherein the at least one groove is further located on the cutting blade surface and extends towards and into the cutting edge.

3. The grater according to claim 1, wherein the at least one groove is further located on the cutting blade surface.

4. The grater according to claim 1, wherein the grating surface includes a plurality of grooves.

5. The grater of claim 1 wherein each of the at least one cutting blade or at least a portion of the cutting edge thereof extends outwardly from the grating surface.

6. The grater according to claim 1, wherein the at least one groove is formed by chemical etching techniques.

7. The grater according to claim 1 wherein each cutting edge and the at least one groove are simultaneously formed by chemical etching techniques.

8. A grater having a grating surface comprising:
   at least one cutting blade extending outwardly from a first surface of the grating surface said at least one cutting blade having a cutting edge, and
   at least one groove, located on the first surface of the grating surface and extending onto said at least one cutting blade at the cutting edge,
   the at least one groove increasing the surface area of the cutting blade relative to the cutting blade having no groove.

9. The grater according to claim 8, wherein each cutting edge comprises a plurality of grooves thereon.

10. The grater according to claim 8, wherein each cutting edge includes at least one groove extending along the length of the cutting edge.

11. The grater according to claim 8, wherein the at least one groove is acid etched.

12. The grater according to claim 8 wherein each cutting edge and at least one groove are simultaneously formed by chemical etching techniques.

* * * * *